(12) United States Patent
Obuchi et al.

(10) Patent No.: US 12,497,537 B2
(45) Date of Patent: Dec. 16, 2025

(54) METHOD OF PRODUCING FLUOROSILICONE RUBBER LAMINATE, AND FLUOROSILICONE RUBBER LAMINATE

(71) Applicant: DOW TORAY CO., LTD., Tokyo (JP)

(72) Inventors: Kiichi Obuchi, Ichihara (JP); Naoya Ishigami, Ichihara (JP); Chiichiro Hasegawa, Fukui (JP)

(73) Assignee: DOW TORAY CO., LTD., Tokyo (JP)

( * ) Notice: Subject to any disclaimer, the term of this patent is extended or adjusted under 35 U.S.C. 154(b) by 900 days.

(21) Appl. No.: 17/764,733

(22) PCT Filed: Sep. 30, 2020

(86) PCT No.: PCT/JP2020/037094
§ 371 (c)(1),
(2) Date: Mar. 29, 2022

(87) PCT Pub. No.: WO2021/065990
PCT Pub. Date: Apr. 8, 2021

(65) Prior Publication Data
US 2022/0325137 A1   Oct. 13, 2022

(30) Foreign Application Priority Data
Sep. 30, 2019   (JP) .................... 2019-180800

(51) Int. Cl.
*C09D 183/08* (2006.01)
*B05D 1/38* (2006.01)
(Continued)

(52) U.S. Cl.
CPC ............. *C09D 183/08* (2013.01); *B05D 1/38* (2013.01); *B05D 7/24* (2013.01); *C08G 77/24* (2013.01); *C09D 5/002* (2013.01)

(58) Field of Classification Search
None
See application file for complete search history.

(56) References Cited

U.S. PATENT DOCUMENTS

| 4,681,636 A | 7/1987 | Saito et al. |
| 5,635,578 A | 6/1997 | Arai et al. |
| 2005/0054762 A1 | 3/2005 | Yaginuma et al. |

FOREIGN PATENT DOCUMENTS

| CN | 101171285 A | 4/2008 |
| CN | 103159968 A | 6/2013 |

(Continued)

OTHER PUBLICATIONS

English translation of International Search Report for PCT/US2020/037094 dated Dec. 1, 2020, 3 pages.
(Continued)

*Primary Examiner* — Jeffrey D Washville
(74) *Attorney, Agent, or Firm* — Warner Norcross + Judd LLP (57) ABSTRACT

Provided is a method of producing a fluorosilicone rubber laminate. The method comprises: (1) applying a primer composition onto a substrate, and forming a primer layer on a surface of the substrate; and (2) bringing a fluorosilicone rubber composition into contact with the primer layer, and adhering a fluorosilicone rubber to the primer layer. The fluorosilicone rubber composition comprises a platinum-based catalyst and/or a fluorosiloxane containing a silicon atom-bonded hydrogen atom. The primer composition comprises a platinum-based catalyst or a fluorosiloxane containing a silicon atom-bonded hydrogen atom, however the primer composition does not simultaneously comprise a platinum-based catalyst and a fluorosiloxane containing a silicon atom-bonded hydrogen atom. Either the primer composition or the fluorosilicone rubber composition comprises a platinum-based catalyst or a fluorosiloxane containing a (Continued)

silicon atom-bonded hydrogen atom. A laminate in which a fluorosilicone rubber layer and a base material are favorably adhered to each other can be obtained.

9 Claims, 1 Drawing Sheet

(51) Int. Cl.
*B05D 7/24* (2006.01)
*C08G 77/24* (2006.01)
*C09D 5/00* (2006.01)

(56) References Cited

FOREIGN PATENT DOCUMENTS

| EP | 0342809 | A2 | | 11/1989 | |
|---|---|---|---|---|---|
| EP | 0534472 | A1 | | 3/1993 | |
| EP | 0798344 | A2 | | 10/1997 | |
| EP | 0798344 | B1 | * | 8/2000 | ............... C08L 83/04 |
| EP | 1616895 | A1 | | 1/2006 | |
| JP | S61278582 | A | | 12/1986 | |
| JP | H0228259 | A | | 1/1990 | |
| JP | H0586352 | A | | 4/1993 | |
| JP | H06306333 | A | | 11/1994 | |
| JP | H08302198 | A | | 11/1996 | |
| JP | H09268257 | A | | 10/1997 | |
| JP | 2002194103 | A | | 7/2002 | |
| JP | 2005060430 | A | | 3/2005 | |
| JP | 2005082669 | A | | 3/2005 | |
| WO | 2006120186 | A1 | | 11/2006 | |
| WO | 2013082989 | A1 | | 6/2013 | |

OTHER PUBLICATIONS

Machine assisted English translation of JP2005060430A obtained from https://patents.google.com/patent on Oct. 12, 2022, 6 pages.
Machine assisted English translation of JPH06306333A obtained from https://patents.google.com/patent on Oct. 12, 2022, 6 pages.
Machine assisted English translation of JP2002194103A obtained from https://patents.google.com/patent on Oct. 12, 2022, 8 pages.

* cited by examiner

METHOD OF PRODUCING FLUOROSILICONE RUBBER LAMINATE, AND FLUOROSILICONE RUBBER LAMINATE

CROSS-REFERENCE TO RELATED APPLICATIONS

This application is the U.S. National Stage of International Application No. PCT/US2020/037094 filed on 30 Sep. 2020, which claims priority to and all advantages of Japanese Patent Application No. 2019-180800 filed on 30 Sep. 2019, the content of which is incorporated herein by reference.

TECHNICAL FIELD

The present invention relates to a method of producing a fluorosilicone rubber laminate and a fluorosilicone rubber laminate obtained by the producing method.

BACKGROUND ART

A fluorosilicone rubber composition primarily containing an organopolysiloxane having a fluoroalkyl group such as a 3,3,3-trifluoropropyl group or the like, forms a fluorosilicone rubber with excellent heat resistance, cold resistance, oil resistance, and fuel resistance, and therefore is used as a rubber material of a fixing roller, paper feeding roller, or the like, or as a rubber material for an automobile or aircraft. However, fluorosilicone rubber compositions do not readily adhere directly to substrates such as metals, plastics, and the like. Therefore, the use of a primer composition has been proposed to adhere the fluorosilicone rubber compositions to substrates such as metals, plastics, and the like.

For example, Patent Document 1 proposes using a primer composition comprising: an organosilicon compound having an organic group containing fluorine and a hydrogen silyl group at both ends of a molecule; and a platinum-based catalyst. Furthermore, Patent Document 2 proposes using a primer composition comprising: a fluorosiloxane containing a silicon atom-bonded hydrogen atom and a platinum-based catalyst. On the other hand, Patent Document 3 proposes a method of curing a fluorosilicone rubber composition comprising: an organopolysiloxane having a degree of polymerization of 1,000 or more and containing a predetermined amount of a 3,3,3-trifluoropropyl group, a fine powder silica-based filler, an organohydrogenpolysiloxane in which the amount of silicon atom-bonded hydrogen atoms is 0.8% by weight or more, and an organic peroxide, after bringing into contact with a substrate treated with a primer composition primarily comprising an organoalkoxysilane containing an alkenyl group.

However, the primer compositions proposed in Patent Documents 1 and 2 simultaneously contain a platinum-based catalyst and a compound having a silicon atom-bonded hydrogen atom. Therefore, the adhesion could not be improved to an extent expected due to a dehydrogenation reaction of the silicon atom-bonded hydrogen atom and the like. Furthermore, in the adhering method proposed in Patent Document 3, significantly improving adhesion between a fluorosilicone rubber and substrate was difficult.

PRIOR ART DOCUMENTS

Patent Documents

Patent Document 1: Japanese Patent Application Publication No. H08-302198 A

Patent Document 2: Japanese Patent Application Publication No. 2005-060430 A

Patent Document 3: Japanese Patent Application Publication No. H09-268257 A

SUMMARY OF THE INVENTION

Problems to be Solved by the Invention

An object of the present invention is to provide a method of producing a fluorosilicone rubber laminate in which a fluorosilicone layer and a substrate are favorably adhered to each other.

Means for Solving the Problems

A method of producing a fluorosilicone rubber laminate of the present invention, comprises the following steps (1) to (2):

(1) a step of applying a primer composition onto a substrate, and then forming a primer layer on a surface of the substrate by drying or curing; and (2) a step of bringing a fluorosilicone rubber composition into contact with the primer layer, and then adhering a fluorosilicone rubber to the primer layer by curing the composition, wherein the fluorosilicone rubber composition contains a platinum-based catalyst and/or a fluorosiloxane containing a silicon atom-bonded hydrogen atom;

the primer composition contains a platinum-based catalyst or a fluorosiloxane containing a silicon atom-bonded hydrogen atom, however the primer composition does not simultaneously contain a platinum-based catalyst and a fluorosiloxane containing a silicon atom-bonded hydrogen atom; and either the primer composition or the fluorosilicone rubber composition contains a platinum-based catalyst or a fluorosiloxane containing a silicon atom-bonded hydrogen atom.

In the present method, the substrate is typically a metal or plastic.

In the present method, the fluorosilicone rubber composition typically comprises:

(a) (a1) an organopolysiloxane having at least 2 alkenyl groups in a molecule, wherein at least 20 mol % of all silicon atom-bonded organic groups are fluoroalkyl groups, or a mixture of component (a1) and (a2) an organopolysiloxane having at least 2 alkenyl groups and having no fluoroalkyl groups or having fluoroalkyl groups in an amount that is less than 20% of all silicon-bonded organic groups in a molecule;

(b) an organic peroxide; and (c) a platinum-based catalyst; and the primer composition typically comprises:

(d) a fluorosiloxane containing a silicon atom-bonded hydrogen atom;

(e) an alkoxysilane and/or a partially hydrolyzed condensate thereof; and (f) a condensation-reaction catalyst.

Moreover, component (d) is typically at least one type selected from a fluorosiloxane represented by the following general formula:

wherein $R^1$ is the same or different and is a monovalent hydrocarbon group having from 1 to 20 carbon atoms free of an aliphatic unsaturated bond, $R^f$ is the same or different fluoroalkyl group, "m" is an integer of 1 or more, "n" is an integer of 2 or more, and the sum of "m" and "n" is an integer of from 5 to 100; or a fluorosiloxane represented by the following average unit formula:

wherein $R^1$ and $R^f$ are the same as described above, and "a" and "b" are numbers satisfying: 0<a<1, 0<b<1, and a+b=1, respectively.

Furthermore, in the present method, the fluorosilicone rubber composition typically comprises:
(a) (a1) an organopolysiloxane having at least 2 alkenyl groups in a molecule, wherein at least 20 mol % of all silicon atom-bonded organic groups are fluoroalkyl groups, or a mixture of component (a1) and (a2) an organopolysiloxane having at least 2 alkenyl groups and having no fluoroalkyl groups or having fluoroalkyl groups in an amount that is less than 20% of all silicon-bonded organic groups in a molecule;
(b) an organic peroxide; and
(d) a fluorosiloxane containing a silicon atom-bonded hydrogen atom;
and
the primer composition typically comprises:
(c) a platinum-based catalyst;
(e) an alkoxysilane and/or a partially hydrolyzed condensate thereof; and
(f) a condensation-reaction catalyst.

Moreover, component (d) is typically at least one type selected from a fluorosiloxane represented by the following general formula:

wherein $R^1$ is the same or different and is a monovalent hydrocarbon group having from 1 to 20 carbon atoms free of an aliphatic unsaturated bond, $R^f$ is the same or different fluoroalkyl group, "m" is an integer of 1 or more, "n" is an integer of 2 or more, and the sum of "m" and "n" is an integer of from 5 to 100; or a fluorosiloxane represented by the following average unit formula:

wherein $R^1$ and $R^f$ are the same as described above, and "a" and "b" are numbers satisfying: 0<a<1, 0<b<1, and a+b=1, respectively.

Furthermore, in the present method, the fluorosilicone rubber composition typically comprises:
(a) (a1) an organopolysiloxane having at least 2 alkenyl groups in a molecule, wherein at least 20 mol % of all silicon atom-bonded organic groups are fluoroalkyl groups, or a mixture of component (a1) and (a2) an organopolysiloxane having at least 2 alkenyl groups and having no fluoroalkyl groups or having fluoroalkyl groups in an amount that is less than 20% of all silicon atom-bonded organic groups in a molecule;
(c) a platinum-based catalyst; and
(d) a fluorosiloxane containing a silicon atom-bonded hydrogen atom;
and
the primer composition typically comprises:
(d) a fluorosiloxane containing a silicon atom-bonded hydrogen atom;
(e) an alkoxysilane and/or a partially hydrolyzed condensate thereof; and
(f) a condensation-reaction catalyst.

Moreover, component (d) is typically at least one type selected from a fluorosiloxane represented by the following general formula:

wherein $R^1$ is the same or different and is a monovalent hydrocarbon group having from 1 to 20 carbon atoms free of an aliphatic unsaturated bond, $R^f$ is the same or different fluoroalkyl group, "m" is an integer of 1 or more, "n" is an integer of 2 or more, and the sum of "m" and "n" is an integer of from 5 to 100; or a fluorosiloxane represented by the following average unit formula:

wherein $R^1$ and $R^f$ are the same as described above, and "a" and "b" are numbers satisfying: 0<a<1, 0<b<1, and a+b=1, respectively.

Furthermore, in the present method, the fluorosilicone rubber composition typically comprises:
(a) (a1) an organopolysiloxane having at least 2 alkenyl groups in a molecule, wherein at least 20 mol % of all silicon atom-bonded organic groups are fluoroalkyl groups, or a mixture of component (a1) and (a2) an organopolysiloxane having at least 2 alkenyl groups and having no fluoroalkyl groups or having fluoroalkyl groups in an amount that is less than 20% of all silicon atom-bonded organic groups in a molecule;
(c) a platinum-based catalyst; and
(d) a fluorosiloxane containing a silicon atom-bonded hydrogen atom;
and
the primer composition typically comprises:
(c) a platinum-based catalyst;
(e) an alkoxysilane and/or a partially hydrolyzed condensate thereof; and
(f) a condensation-reaction catalyst.

Moreover, component (d) is typically at least one type selected from a fluorosiloxane represented by the following general formula:

wherein $R^1$ is the same or different and is a monovalent hydrocarbon group having from 1 to 20 carbon atoms free of an aliphatic unsaturated bond, $R^f$ is the same or different fluoroalkyl group, "m" is an integer of 1 or more, "n" is an integer of 2 or more, and the sum of "m" and "n" is an integer of from 5 to 100; or a fluorosiloxane represented by the following average unit formula:

wherein $R^1$ and $R^f$ are the same as described above, and "a" and "b" are numbers satisfying: 0<a<1, 0<b<1, and a+b=1, respectively.

A fluorosilicone rubber laminate of the present invention contains a fluorosilicone rubber and a substrate, and is obtained by the aforementioned producing method.

Effects of the Invention

According to the producing method of the present invention, a fluorosilicone rubber laminate in which a fluorosilicone rubber layer and a substrate are favorably adhered to each other can be produced.

DESCRIPTION OF THE PREFERRED EMBODIMENT

A method of producing a fluorosilicone rubber laminate of the present invention, comprises the following steps (1) to (2):

[Step (1)]

First, a primer composition is applied on a substrate. Examples of the substrate include: iron, copper, nickel, aluminum, zinc, stainless steel, titanium, and other metals; and acrylonitrile butadiene styrene (ABS) resins, polyethylene terephthalate (PET) resins, polybutylene terephthalate (PBT) resins, nylon resins, polyphenylene sulfide (PPS) resins, polymethyl methacrylate (PMMA) resins, polycarbonate (PC) resins, polyimide (PI) resins, polyamide (PA) resins, and other plastics. As a method of applying the primer composition, ordinary methods such as brush coating, spray coating, immersion coating, and the like can be employed.

Next, the primer composition is dried and cured to form a primer layer on a surface of the substrate. In order to promote drying or curing of the primer composition, heating to 70° C. or lower may be performed.

[Step (2)]

Next, a fluorosilicone rubber composition is brought into contact with the primer layer. In this case, the primer composition is preferably applied onto the substrate, and then air dried for 30 minutes or more, and the fluorosilicone rubber composition is then brought into contact thereto. The method of laminating the fluorosilicone rubber composition to the primer layer is not limited, and examples include methods of placing the fluorosilicone rubber composition on a substrate having the primer layer in a compression molding machine and then compression molding and methods of placing the substrate in a mold and injecting the fluorosilicone rubber composition into the mold.

Next, the fluorosilicone rubber is adhered to the primer layer by curing the fluorosilicone rubber composition. Although the conditions for curing the fluorosilicone rubber composition are not limited, heating and pressing are preferably performed for 5 to 20 minutes under a pressure of 100 to 250 kgf/cm$^2$ and a temperature of 170 to 190° C. Furthermore, after the fluorosilicone rubber laminate is molded, secondary vulcanization may be performed by heat-treating the laminate.

In the present method, the primer composition contains a platinum-based catalyst or a fluorosiloxane containing a silicon atom-bonded hydrogen atom, and the fluorosilicone rubber composition contains a platinum-based catalyst and/or a fluorosiloxane containing a silicon atom-bonded hydrogen atom; However, the primer composition does not simultaneously contain the platinum-based catalyst and the fluorosiloxane containing a silicon atom-bonded hydrogen atom, and either the primer composition or the fluorosilicone rubber composition contains the platinum-based catalyst or the fluorosiloxane containing a silicon atom-bonded hydrogen atom.

Examples of combinations of such fluorosilicone rubber composition and primer composition are as follows.

Combination 1

The fluorosilicone rubber composition comprises:
(a) (a1) an organopolysiloxane having at least 2 alkenyl groups in a molecule, wherein at least 20 mol % of all silicon atom-bonded organic groups are fluoroalkyl groups, or a mixture of component (a1) and (a2) an organopolysiloxane having at least 2 alkenyl groups and having no fluoroalkyl groups or having fluoroalkyl groups in an amount that is less than 20% of all silicon atom-bonded organic groups in a molecule;
(b) an organic peroxide; and
(c) a platinum-based catalyst; and the primer composition comprises:
(d) a fluorosiloxane containing a silicon atom-bonded hydrogen atom;
(e) an alkoxysilane and/or a partially hydrolyzed condensate thereof; and
(f) a condensation-reaction catalyst.

Combination 2

The fluorosilicone rubber composition comprises:
(a) (a1) an organopolysiloxane having at least 2 alkenyl groups in a molecule, wherein at least 20 mol % of all silicon atom-bonded organic groups are fluoroalkyl groups, or a mixture of component (a1) and (a2) an organopolysiloxane having at least 2 alkenyl groups and having no fluoroalkyl groups or having fluoroalkyl groups in an amount that is less than 20% of all silicon atom-bonded organic groups in a molecule;
(b) an organic peroxide; and
(d) a fluorosiloxane containing a silicon atom-bonded hydrogen atom; and the primer composition comprises:
(c) a platinum-based catalyst;
(e) an alkoxysilane and/or a partially hydrolyzed condensate thereof; and
(f) a condensation-reaction catalyst.

Combination 3

The fluorosilicone rubber composition comprises:
(a) (a1) an organopolysiloxane having at least 2 alkenyl groups in a molecule, wherein at least 20 mol % of all silicon atom-bonded organic groups are fluoroalkyl groups, or a mixture of component (a1) and (a2) an organopolysiloxane having at least 2 alkenyl groups and having no fluoroalkyl groups or having fluoroalkyl groups in an amount that is less than 20% of all silicon atom-bonded organic groups in a molecule;
(c) a platinum-based catalyst; and
(d) a fluorosiloxane containing a silicon atom-bonded hydrogen atom; and
the primer composition comprises:
(d) a fluorosiloxane containing a silicon atom-bonded hydrogen atom;
(e) an alkoxysilane and/or a partially hydrolyzed condensate thereof; and
(f) a condensation-reaction catalyst.

Combination 4

The fluorosilicone rubber composition comprises:
(a) (a1) an organopolysiloxane having at least 2 alkenyl groups in a molecule, wherein at least 20 mol % of all silicon atom-bonded organic groups are fluoroalkyl groups, or a mixture of component (a1) and (a2) an organopolysiloxane having at least 2 alkenyl groups and having no fluoroalkyl groups or having fluoroalkyl groups in an amount that is less than 20% of all silicon atom-bonded organic groups in a molecule;
(c) a platinum-based catalyst; and
(d) a fluorosiloxane containing a silicon atom-bonded hydrogen atom; and the primer composition comprises:
(c) a platinum-based catalyst;
(e) an alkoxysilane and/or a partially hydrolyzed condensate thereof; and
(f) a condensation-reaction catalyst.

Each component will be described in detail below.

Component (a) is a main agent of the fluorosilicone rubber composition, and is (a1) an organopolysiloxane having at least 2 alkenyl groups in a molecule, wherein at least 20 mol % of all silicon atom-bonded organic groups are fluoroalkyl groups, or a mixture of component (a1) and (a2) an organopolysiloxane having at least 2 alkenyl groups and having no fluoroalkyl groups or having fluoroalkyl groups in an amount that is less than 20% of all silicon-bonded organic groups in a molecule.

Component (a1) is an organopolysiloxane having at least 2 alkenyl groups in a molecule, wherein at least 20 mol % of all silicon atom-bonded organic groups are fluoroalkyl groups. Examples of the alkenyl groups in component (a1) include alkenyl groups having from 2 to 12 carbon atoms such as vinyl groups, allyl groups, butenyl groups, and hexenyl groups. Vinyl groups are preferable. Furthermore, examples of the fluoroalkyl groups in component (a1) include fluoroalkyl groups having from 3 to 12 carbon atoms such as 3,3,3-trifluoropropyl groups, 4,4,4,3,3-pentafluorobutyl groups, 5,5,5,4,4,3,3-heptafluoropentyl groups, 6,6,6,5,5,4,4,3,3-nonafluorohexyl groups, 7,7,7,6,6,5,5,4,4,3,3-undecafluoroheptyl groups, and the like. 3,3,3-trifluoropropyl groups, 4,4,4,3,3-pentafluorobutyl groups, and 5,5,5,4,4,3,3-heptafluoropentyl groups are preferable. The amount of the fluoroalkyl group in component (a1) is at least 20 mol %, preferably at least mol %, and at most 70 mol %, or at most 60 mol %, of all of the silicon atom-bonded organic groups. The amount of the fluoroalkyl group can be an arbitrary range that combines the upper and lower limits described above. This is because, when the amount of the fluoroalkyl groups in component (a1) is equal to or greater than the lower limit described above, the oil resistance and fuel resistance of the obtained fluorosilicone rubber are enhanced, whereas when the amount is equal to or less than the upper limit described above, the heat resistance and cold resistance of the obtained fluorosilicone rubber are enhanced. Examples of groups bonded to silicon atoms other than the alkenyl groups and fluoroalkyl groups in component (a1) include monovalent hydrocarbon groups having from 1 to 20 carbon atoms and preferably having 1 to 8 carbon atoms. Specific examples thereof include alkyl groups such as methyl groups, ethyl groups, propyl groups, butyl groups, and the like; cycloalkyl groups such as cyclohexyl groups and the like; aryl groups such as phenyl groups, tolyl groups, and the like; and aralkyl groups such as benzyl groups, phenethyl groups, and the like. Alkyl groups are preferable, and methyl groups are particularly preferable.

The molecular structure of such component (a1) is not limited, and examples include straight-chain structures, partially branched straight-chain structures, and branched-chain structures. Furthermore, while not limited thereto, the viscosity of component (a1) is preferably in a liquid form having a viscosity at 25° C. of at least 1 Pa·s to raw rubber form. The liquid substance is particularly preferably a liquid having a viscosity at 25° C. of at least 10 Pa·s, and at most 1,000 Pa·s. Note that the viscosity at 25° C. of component (a1) can be measured by a rotational viscometer in accordance with JIS K7117-1. In contrast, the raw rubber form is particularly preferably a raw rubber form having a Williams plasticity number at 25° C. of 100 to 800 specified in JIS K 6249, a raw rubber form having a Williams plasticity number of 100 to 400, or a raw rubber having a Williams plasticity number of 200 to 400.

Component (a2) is an organopolysiloxane having at least 2 alkenyl groups and having no fluoroalkyl groups or having fluoroalkyl groups in an amount that is less than 20% of all silicon atom-bonded organic groups in a molecule. Examples of the alkenyl groups in component (a2) include alkenyl groups having from 2 to 12 carbon atoms such as vinyl groups, allyl groups, butenyl groups, and hexenyl groups. Vinyl groups are preferable. Component (a2) has no fluoroalkyl groups or has fluoroalkyl groups wherein the amount thereof is at most 20 mol % of all of the silicon atom-bonded organic groups. Examples of the fluoroalkyl groups that may be present in component (a2) include fluoroalkyl groups having from 3 to 12 carbon atoms such as 3,3,3-trifluoropropyl groups, 4,4,4,3,3-pentafluorobutyl groups, 5,5,5,4,4,3,3-heptafluoropentyl groups, 6,6,6,5,5,4,4,3,3-nonafluorohexyl groups, 7,7,7,6,6,5,5,4,4,3,3-undecafluoroheptyl groups, and the like. 3,3,3-trifluoropropyl groups, 4,4,4,3,3-pentafluorobutyl groups, and 5,5,5,4,4,3,3-heptafluoropentyl groups are preferable. Examples of groups bonded to silicon atoms other than the alkenyl groups and fluoroalkyl groups in component (a2) include monovalent hydrocarbon groups having from 1 to 20 carbon atoms and preferably having 1 to 8 carbon atoms. Specific examples thereof include alkyl groups such as methyl groups, ethyl groups, propyl groups, butyl groups, and the like; cycloalkyl groups such as cyclohexyl groups and the like; aryl groups such as phenyl groups, tolyl groups, and the like; and aralkyl groups such as benzyl groups, phenethyl groups, and the like. Alkyl groups are preferable, and methyl groups are particularly preferable.

The molecular structure of such a component (a2) is not limited, and examples include straight-chain structures, partially branched straight-chain structures, and branched-chain structures. Furthermore, while not limited thereto, the viscosity of component (a2) is preferably in a liquid form having a viscosity at 25° C. of at least 1 Pa·s to raw rubber form. The liquid substance is particularly preferably a liquid having a viscosity at 25° C. of at least 10 Pa·s, and at most 1,000 Pa·s. Note that the viscosity at 25° C. of component (a2) can be measured using a rotational viscometer in accordance with JIS K7117-1. In contrast, the raw rubber form is particularly a raw rubber form having a Williams plasticity number at 25° C. of 100 to 800 set forth in JIS K 6249 or a raw rubber form having a Williams plasticity number of 100 to 400.

Component (a) is either component (a1) alone or a mixture of component (a1) and component (a2). When component (a) is a mixture of component (a1) and component (a2) described above, the mass ratio of component (a1) to component (a2) is preferably within a range of 50:50 to 99:1, 60:40 to 99:1, 70:30 to 99:1, 80:20 to 99:1, or 85:15 to 99:1. This is because when the ratio of component (a1) is equal to or above the lower limit of the aforementioned range, the oil resistance and fuel oil resistance of the obtained fluorosilicone rubber are enhanced, while when the ratio is equal to or below the upper limit of the aforementioned range, affinity with other components is favorable.

Component (b) is an organic peroxide for curing the fluorosilicone rubber composition described above by a radical reaction. As component (b), a known organic peroxide can be used to cure the fluorosilicone rubber composition. Examples of such component (b) include benzoyl peroxide, tertiary butyl peroxide, orthomethyl benzoyl peroxide, paramethyl benzoyl peroxide, di-tertiary butyl peroxide, di-cumyl peroxide, 1,1-bis(tertiary butyl peroxide)3,3,5-trimethylcyclohexane, 2,5-dimethyl-2,5-di(tertiary butyl peroxide)hexane, 2,5-dimethyl-2,5-di(tertiary butyl peroxide)hexyne, and combinations of two or more types thereof.

Although not limited to this, the amount of component (b) is preferably at least 0.1 part by mass, at least 0.5 parts by mass, or at least 1 part by mass relative to 100 parts by mass of the aforementioned component (a), while the amount is at most 10 parts by mass, at most 5 parts by mass, or at most 3 parts by mass. The amount can be an arbitrary range in which the upper and lower limits described above are combined. This is because, when the amount of component (b) is equal to or more than the lower limit of the aforementioned range, the obtained fluorosilicone rubber composition is sufficiently cured, while when the amount is equal to or less than the upper limit of the aforementioned range, the mechanical properties of the obtained fluorosilicone rubber are favorable.

Component (c) is a platinum-based catalyst for improving adhesion between the fluorosilicone rubber composition and the primer layer. Component (c) in the fluorosilicone rubber composition in combinations 3 and 4 above also functions as a catalyst for curing the composition in a hydrosilylation reaction. Examples of component (c) include platinum chloride acids, alcohol solutions of platinum chloride acid, carbonyl complexes of platinum, alkenylsiloxane complexes of platinum, and olefin complexes of platinum. In particular, for blending component (c) into the fluorosilicone rubber composition described above, an alkenylsiloxane complex of platinum is preferable due to favorable compatibility with component (a). Examples of alkenyl siloxanes in this alkenyl siloxane complex of platinum include 1,3-divinyltetramethyldisiloxane and 1,1,3,3-tetravinyldimethyldisiloxane.

When component (c) is blended into the fluorosilicone rubber composition, the amount thereof is not limited but can be an amount where platinum atoms in component (c) with regard to the fluorosilicone rubber composition is at least 0.1 ppm, at least 1 ppm, or at least 5 ppm by mass, while the amount can be an amount of at most 1,000 ppm, at most 500 ppm, at most 250 ppm, at most 200 ppm, or at most 100 ppm. The amount can be an arbitrary range in which the upper limit and lower limit described above are combined. This is because when the amount of component (c) is equal to or above the lower limit of the aforementioned range, adhesion between the fluorosilicone rubber composition and the primer layer is enhanced, and when the fluorosilicone rubber composition is cured based on a hydrosilylation reaction, the curing thereof is sufficiently promoted. On the other hand, when the amount is equal to or less than the upper limit of the aforementioned range, problems such as coloring or the like of the obtained fluorosilicone rubber are less likely to occur.

On the other hand, when component (c) is blended into the primer composition, the amount thereof is not limited but can be an amount where platinum atoms in component (c) with regard to component (e) is at least 0.1 ppm, at least 1 ppm, at least 10 ppm, or at least 100 ppm by mass, while the amount can be an amount of at most 2,000 ppm, at most 1,000 ppm, at most 1,500 ppm, or at most 1,000 ppm. The amount can be an arbitrary range in which the upper limit and lower limit described above are combined. This is because when the amount of component (c) is equal to or above the lower limit of the aforementioned range, adhesion between the fluorosilicone rubber composition and the primer layer is enhanced, while when the amount is equal to or below the upper limit of the aforementioned range, problems such as coloring or the like of the obtained primer layer are less likely to occur.

Component (d) is a fluorosiloxane containing a silicon atom-bonded hydrogen atom for improving adhesion between the fluorosilicone rubber composition and the primer layer, and component (d) in the fluorosilicone rubber composition in combinations 3 and 4 described above functions as a crosslinking agent for curing the composition in a hydrosilylation reaction. Note that in combination 3 described above, component (d) in the fluorosilicone rubber composition described above and component (d) in the primer composition described above may be the same or may be different. Such component (d) is preferably an organosiloxane having at least two silicon atom-bonded hydrogen atoms and at least one fluoroalkyl group in a molecule. Examples of the fluoroalkyl groups in component (d) include fluoroalkyl groups having from 3 to 12 carbon atoms such as 3,3,3-trifluoropropyl groups, 4,4,4,3,3-pentafluorobutyl groups, 5,5,5,4,4,3,3-heptafluoropentyl groups, 6,6,6,5,5,4,4,3,3-nonafluorohexyl groups, 7,7,7,6,6,5,5,4,4,3,3-undecafluoroheptyl groups, and the like. 3,3,3-trifluoropropyl groups, 4,4,4,3,3-pentafluorobutyl groups, and 5,5,5,4,4,3,3-heptafluoropentyl groups are preferable. Although not limited, the amount of the fluoroalkyl group in component (d) is at least 5 mol %, at least 10 mol %, or at least 15 mol %, and at most 70 mol %, at most 60 mol %, at most 50 mol %, or at most 40 mol %, of all of the silicon atom-bonded organic groups. The amount of the fluoroalkyl group can be an arbitrary range that combines the upper and lower limits described above. This is because when the amount of the fluoroalkyl groups in component (d) is equal to or greater than the lower limit described above, and when component (d) is blended in the fluorosilicone rubber composition, the oil resistance and fuel resistance of the obtained fluorosilicone rubber are enhanced, and adhesion with the obtained fluorosilicone rubber is enhanced, while when the amount is equal to or less than the upper limit described above, the heat resistance and cold resistance of the obtained fluorosilicone rubber are enhanced. Examples of groups bonded to silicon atoms other than the hydrogen atoms and fluoroalkyl groups in component (d) include monovalent hydrocarbon groups having no aliphatic unsaturated bonds and having from 1 to 20 carbon atoms and preferably having 1 to 8 carbon atoms. Specific examples thereof include alkyl groups such as methyl groups, ethyl groups, propyl groups, butyl groups, and the like; cycloalkyl groups such as cyclohexyl groups and the like; aryl groups such as phenyl groups, tolyl groups, and the like; and aralkyl groups such as benzyl groups, phenethyl groups, and the like. Alkyl groups are preferable, and methyl groups are particularly preferable.

The molecular structure of component (d) is not limited, and examples include straight-chain structures, partially branched straight-chain structures, branched-chain structures, mesh structures, and cyclic structures. A mixture of two or more types of these molecular structures may also be used. Examples of such component (d) include: organopolysiloxanes represented by the following general formula:

and organopolysiloxanes represented by the following average unit formula:

In the formulas, $R^1$ represents the same or different monovalent hydrocarbon groups having no aliphatic unsaturated bonds and having from 1 to 20 carbon atoms, and examples thereof include the same groups as those described above. Alkyl groups are preferable, and methyl groups are particularly preferable.

In addition, in the formulas, $R^f$ represents the same or different fluoroalkyl groups, and examples thereof include the same groups as those described above.

Further, in the formulas, "m" is an integer of 1 or greater; "n" is an integer of 2 or greater; the total of "m" and "n" is an integer within the range of from 5 to 100; and the total of "m" and "n" is preferably an integer within the range of from 10 and 50. In addition, the proportion of $R^f$ with respect to the total of $R^1$ and $R^f$ in each molecule is preferably at least mol %, at least 10 mol %, or at least 15 mol % and at most 70 mol %, at most 60 mol %, at most 50 mol %, or at most 40 mol %. Note that the ratio of $R^f$ can be within an arbitrary range in which the lower and upper limits described above are combined.

Further, in the formulas, "a" and "b" are respectively numbers that satisfy: 0<a<1, 0<b<1, and a+b=1. In addition, the proportion of $R^f$ with respect to the total of $R^1$ and $R^f$ in each molecule is preferably at least 5 mol %, at least 10 mol %, or at least 15 mol % and at most 70 mol %, at most 60 mol %, at most 50 mol %, or at most 40 mol %. Note that the ratio of $R^f$ can be within an arbitrary range in which the lower and upper limits described above are combined.

When component (d) is blended with the fluorosilicone rubber composition in combination 2 described above, the amount thereof is not limited but is preferably at least 0.1 part by mass, at least 0.5 parts by mass, or at least 1 part by mass relative to 100 parts by mass of the aforementioned component (a), while the amount is at most 20 parts by mass, at most 10 parts by mass, or at most 5 parts by mass. The amount can be an arbitrary range in which the upper and lower limits described above are combined. This is because when the amount of component (d) is equal to or above the lower limit of the aforementioned range, adhesion of the obtained fluorosilicone rubber to a primer is enhanced, whereas when the amount is equal to or below the upper limit of the aforementioned range, the heat resistance of the obtained fluorosilicone rubber in the laminate after exposure to a high temperature environment is enhanced.

Furthermore, when component (d) is blended in the fluorosilicone rubber composition in combinations 3 and 4 described above, the amount thereof is not limited but is preferably an amount where the silicon atom-bonded hydrogen atoms in component (d) is at least 1 mol, at least 2 mols, or at least 3 mols relative to a total of 1 mol of alkenyl groups in component (a), while the amount is at most 30 mols, at most 20 mols, at most mols, or at most 5 mols. The amount can be an arbitrary range in which the lower and upper limits described above are combined. This is because when the amount of component (d) is equal to or above the lower limit of the aforementioned range, the obtained fluorosilicone rubber composition is sufficiently cured, whereas when the amount is equal to or below the upper limit of the aforementioned range, the heat resistance of the obtained fluorosilicone rubber in the laminate after exposure to a high temperature environment is enhanced.

Furthermore, when component (d) is blended with the primer composition, the amount thereof is not limited but is preferably at least 1 part by mass, at least 5 parts by mass, or at least 10 parts by mass relative to 100 parts by mass of the aforementioned component (e), while the amount is at most 500 parts by mass, at most 400 parts by mass, at most 300 parts by mass, or at most 250 parts by mass. The amount can be an arbitrary range in which the upper and lower limits described above are combined. This is because when the amount of component (d) is equal to or above the lower limit of the aforementioned range, adhesion of the obtained fluorosilicone rubber to a primer is enhanced, while when the amount is equal to or below the upper limit of the aforementioned range, the mechanical strength of the primer layer is enhanced.

Component (e) is a main agent of the aforementioned primer composition, and is an alkoxysilane and/or a partially hydrolyzed condensate thereof for forming a primer layer on the surface of the substrate by a condensation reaction using a component (f) described below. Examples of such components (e) include trimethoxysilane, triethoxysilane, methyltrimethoxysilane, ethyltrimethoxysilane, vinyltrimethoxysilane, methylvinyldimethoxysilane, vinyltriethoxysilane, vinyltris(β-methoxyethoxy)silane, allyltrimethoxysilane, allyltriethoxysilane, allylmethyldiethoxysilane, tetramethoxysilane, tetraethoxysilane, and methyl polysilicates and ethyl polysilicate, which are partially hydrolyzed condensates of these alkoxysilanes.

Component (f) is a condensation-reaction catalyst for crosslinking the primer composition described above. Specific examples include organic titanium compounds and organic tin compounds, and organic titanium compounds are preferable. Examples of these organic titanium compounds include tetraisopropyl titanate, tetra(n-propyl)titanate, tetra (n-butyl)titanate, tetra(2-ethylhexyl)titanate, dibutyl diisopropyl titanate, triethanolamine titanate, ethylene glycol titanate, bis(acetylacetone)diisopropoxy titanium, bis(ethylacetylacetonate)diisopropoxy titanium, and tetra(trimethylsiloxy)titanate.

Although not particularly limited, the amount of component (f) is preferably at least 1 part by mass, at least 10 parts by mass, or at least 50 parts by mass relative to 100 parts by mass of component (e), while the amount is at most 200 parts by mass, at most 150 parts by mass, or at most 100 parts by mass. The amount can be an arbitrary range in which the upper and lower limits described above are combined. This is because when the amount of component (f) is equal to or above the lower limit of the aforementioned range, adhesion of the obtained primer to the substrate is enhanced, while when the amount is equal to or below the upper limit of the aforementioned range, the mechanical strength of the primer layer is enhanced.

Component (g) is an optional organic solvent for improving the coatability of the primer composition described above. Examples of such component (g) include toluene, xylene, and other aromatic solvents; n-heptane, n-hexane, cyclohexane, and other aliphatic hydrocarbon solvents; acetone, methyl ethyl ketone, methyl isobutyl ketone, and other ketone solvents; ethyl acetate, butyl acetate and other ester solvents; tetrahydrofuran, diethyl ether and other ether solvents.

Although not particularly limited, the amount of component (g) may be changed as appropriate in order to adjust the coatability, and is preferably at most 5,000 parts by mass relative to 100 parts by mass of component (e).

The fluorosilicone rubber composition described above may contain a silica fine powder in order to enhance the mechanical properties of the resulting fluorosilicone rubber. Examples of the silica fine powder include dry method silica such as fumed silica and wet method silica such as precipitated silica. Further, fine powdered silicas in which the surfaces of these silicas are subjected to hydrophobization treatment with an organosilicon compound such as organosilane, hexaorganodisilazane, diorganopolysiloxane, or diorganocyclopolysiloxane can also be used. The BET specific surface area of the silica fine powder is preferably within the range of from 50 to 400 m$^2$/g or within the range of from 100 to 400 m$^2$/g.

The amount of the silica fine powder is not limited, but is preferably 10 parts by mass or more relative to 100 parts by mass of component (a) in that the mechanical properties of the obtained fluorosilicone rubber are favorable, and is preferably 100 parts by mass or less relative to 100 parts by mass of component (a) in that the moldability of the obtained fluorosilicone rubber is favorable.

Furthermore, in the fluorosilicone rubber compositions in combinations 3 and 4 described above, a reaction inhibitor may be included to adjust the curing rate thereof. Examples of the reaction inhibitor include alkyne alcohols such as 2-methyl-3-butyn-2-ol, 3,5-dimethyl-1-hexyn-3-ol, 3-methyl-1-pentyn-3-ol, 2-phenyl-3-butyn-2-ol, 1-ethynyl-1-cyclohexanol, 2-ethynylisopropanol, 2-ethynylbutan-2-ol, and the like; silylated acetylene alcohols such as trimethyl (3,5-dimethyl-1-hexyn-3-oxy)silane, dimethyl bis(3-methyl-1-butynoxy)silane, methylvinyl bis(3-methyl-1-butyn-3-oxy)silane, [(1,1-dimethyl-2-propynyl)oxy] trimethylsilane, and the like; enyne compounds such as 2-isobutyl-1-buten-3-yne, 3,5-dimethyl-3-hexen-1-yne, 3-methyl-3-penten-1-yne, 3-methyl-3-hexen-1-yne, 1-ethynylcyclohexene, 3-ethyl-3-buten-1-yne, 3-phenyl-3-buten-1-yne, and the like; unsaturated carboxylic acid esters such as diallyl maleate, dimethyl maleate, diethyl fumarate, diallyl fumarate, bis-2-methoxy-1-methylethyl maleate, monooctyl maleate, monoisooctyl maleate, monoallyl maleate, monomethyl maleate, monoethyl fumarate, monoallyl fumarate, 2-methoxy-1-methylethyl maleate, and the like; alkenylsiloxanes such as 1,3,5,7-tetramethyl-1,3,5,7-tetravinylcyclotetrasiloxane, 1,3,5,7-tetramethyl-1,3,5,7-tetrahexenylcyclotetrasiloxane, and the like; and benzotriazoles.

Although not limited to this, the amount of the reaction inhibitor is preferably at least 0.01 parts by mass or at least 0.1 parts by mass relative to 100 parts by mass of component (a), while the amount is at most 5 parts by mass or at most 3 parts by mass. The amount can be an arbitrary range in which the lower and upper limits described above are combined.

In addition, various compounding agents that are ordinarily used in fluorosilicone rubber compositions may also be compounded with the fluorosilicone rubber composition to a degree that the object of the present invention is not diminished. Examples of compounding agents include extender fillers such as diatomaceous earth, quartz powder, and calcium carbonate; pigments such as titanium oxide, carbon black, and red iron oxide; heat resistant agents such as rare earth oxides, cerium silanolate, and cerium fatty acid salts; and metal mold release agents such as fatty acids such as stearic acid, zinc stearate, and calcium stearate and metal salts thereof.

[Fluorosilicone Rubber Laminate]

Figure 1:
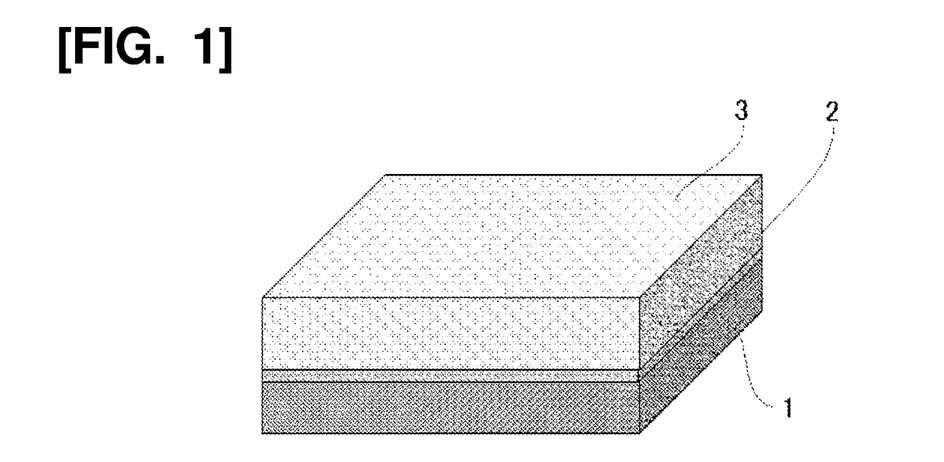
FIG. 1 is a perspective view of an example of a fluorosilicone rubber laminate obtained by a method of the present invention.
Figure 2:
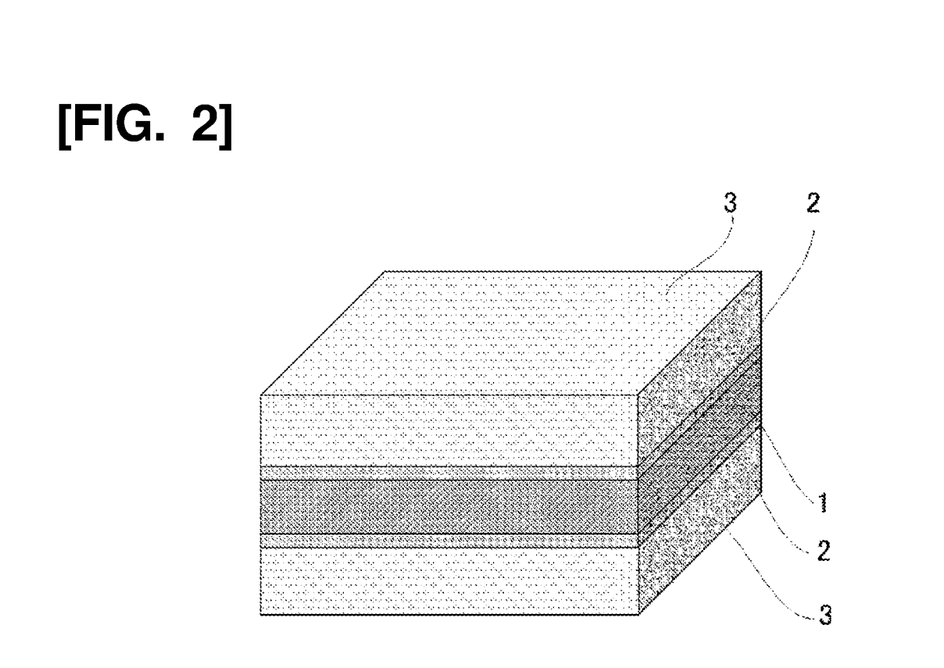
FIG. 2 is a perspective view of another example of a fluorosilicone rubber laminate obtained by the method of the present invention.

A fluorosilicone rubber laminate of the present invention contains a fluorosilicone rubber and a substrate, and is obtained by the aforementioned producing method. In the present laminate, the thickness of the fluorosilicone rubber laminated on the primer layer is not limited, nor is the shape thereof. Examples of the present laminate include a laminate having a primer layer 2 on one surface of a substrate 1 and a fluorosilicone rubber layer 3 through the primer layer 2, as illustrated in FIG. 1 and a laminate having a primer layer 2 on both surfaces of a substrate 1 and a fluorosilicone rubber layer 3 through the primer layer 2, as illustrated in FIG. 2.

EXAMPLES

The method of producing a fluorosilicone rubber laminate and the fluorosilicone rubber laminate of the present invention will be described in detail using Examples and Comparative Examples. Note that the present invention is not limited to these examples. Furthermore, in the examples, properties such as viscosity and plasticity are values at room temperature (25° C.), unless otherwise limited. Note that the viscosity (Pa·s) is a value measured using a rotational viscometer conforming to JIS K7117-1; the kinematic viscosity ($mm^2/s$) is a value measured with an Ubbelohde viscometer; and the Williams plasticity is a value measured with the method specified in JIS K 6249.

Reference Example 1

First, 100 parts by mass of a copolymer of methylvinylsiloxane and methyl(3,3,3-trifluoropropyl)siloxane capped at both molecular chain terminals with hydroxy groups and having a Williams plasticity number of 300 (a content of vinyl groups=0.01 mass %; a content of 3,3,3-trifluoropropyl relative to all silicon atom-bonded organic groups=approximately 50 mol %), 5.6 parts by mass of a copolymer of dimethylsiloxane and methylvinylsiloxane essentially capped at both molecular chain terminals with dimethylvinylsiloxy groups and partially capped molecular chain terminals with hydroxy groups, and having a Williams plasticity number of 165 (a content of vinyl groups=0.07 mass %), 5.6 parts by mass of a copolymer of dimethylsiloxane and methylvinylsiloxane capped at both molecular terminals with hydroxy groups and having a Williams plasticity number of 160 (a content of vinyl groups=1.4 mass %), 41 parts by mass of fumed silica having a BET specific surface area of 130 $m^2/g$, and 5.6 parts by mass of methyl (3,3,3-trifluoropropyl)siloxane oligomer capped at both molecular terminals with hydroxy groups and having a kinematic viscosity of 30 $mm^2/s$, were charged into a kneader mixer, mixed for 2 hours at 50° C., and kneaded for 2 more hours at 120° C. under reduced pressure to prepare a fluorosilicone rubber base compound.

Next, in 100 parts by mass of the fluorosilicone rubber base compound, 0.9 parts by mass of 2,5-dimethyl-2,5-di (tert-butylperoxy)hexane, 2.9 parts by mass of a catalyst for a hydrosilylation reaction (a content of platinum=0.06 mass %), wherein the catalyst was produced by dilute a platinum-1,3-divinyl-1,1,3,3-tetramethyldisiloxane complex with a copolymer of dimethylsiloxane and methylvinylsiloxane essentially capped at both molecular chain terminals with dimethylvinylsiloxy groups and partially capped molecular chain terminals with hydroxy groups, and having a Williams plasticity number of 165 (a content of vinyl groups=0.07 mass %), and 0.2 parts by mass of a pigment paste of iron oxide (III) (XIAMETER™ CP-21 Brown Rubber Additive Pigment manufactured by DOW TORAY Co., Ltd.), were uniformly mixed to prepare a fluorosilicone rubber composition (1).

Reference Example 2

In 100 parts by mass of the fluorosilicone rubber base compound prepared in Reference Example 1, 2.8 parts by mass of an organopolysiloxane represented by the following average unit formula:

$[H(CH_3)_2SiO_{1/2}]_{0.65}(CF_3C_2H_4SiO_{3/2})_{0.35}$ 0.9 parts by mass of 2,5-dimethyl-2,5-di(tert-butylperoxy) hexane, and 0.2 parts by mass of a pigment paste of iron oxide (III) (XIAMETER™ CP-21 Brown Rubber Additive Pigment manufactured by DOW TORAY Co., Ltd.), were uniformly mixed to prepare a fluorosilicone rubber composition (2).

Reference Example 3

In 100 parts by mass of the fluorosilicone rubber base compound prepared in Reference Example 1, 2.8 parts by mass of an organopolysiloxane represented by the following average unit formula:

[H(CH$_3$)$_2$SiO$_{1/2}$]$_{0.65}$(CF$_3$C$_2$H$_4$SiO$_{3/2}$)$_{0.35}$ (in an amount that the silicon atom-bonded hydrogen atoms is 3.5 mols relative to 1 mol of all vinyl groups in the fluorosilicone rubber composition), 2.9 parts by mass of a catalyst for a hydrosilylation reaction (a content of platinum=0.02 mass %), wherein the catalyst was produced by dilute a platinum-1,3-divinyl-1,1,3,3-tetramethyldisiloxane complex with a copolymer of dimethylsiloxane and methylvinylsiloxane essentially capped at both molecular chain terminals with dimethylvinylsiloxy groups and partially capped molecular chain terminals with hydroxy groups, and having a Williams plasticity number of 165 (a content of vinyl groups=0.07 mass %), 0.6 parts by mass of 1-ethyl-cyclohexanol, and 0.2 parts by mass of a pigment paste of iron oxide (III) (XIAMETER™ CP-21 Brown Rubber Additive Pigment manufactured by DOW TORAY Co., Ltd.), were uniformly mixed to prepare a fluorosilicone rubber composition (3).

Reference Example 4

In 100 parts by mass of the fluorosilicone rubber base compound prepared in Reference Example 1, 0.9 parts by mass of 2,5-dimethyl-2,5-di(tert-butylperoxy)hexane and 0.2 parts by mass of a pigment paste of iron oxide (III) (XIAMETER™ CP-21 Brown RubberAdditive Pigment manufactured by DOW TORAY Co., Ltd.), were uniformly mixed to prepare a fluorosilicone rubber composition (4).

Reference Example 5

92 parts by mass of n-heptane, 0.2 parts by mass of tetraethoxysilane, 4 parts by mass of ethyl polysilicate, 4 parts by mass of tetra(n-butyl)titanate, and 10.2 parts by mass of an organopolysiloxane represented by the following average unit formula:

[H(CH$_3$)$_2$SiO$_{1/2}$]$_{0.65}$(CF$_3$C$_2$H$_4$SiO$_{3/2}$)$_{0.35}$, were uniformly mixed to prepare a primer composition (1).

Reference Example 6

94 parts by mass of n-heptane, 4.2 parts by mass of allyltrimethoxysilane, 0.5 parts by mass of a 1,3-divinyl-1,1,3,3-tetramethyldisiloxane solution of a 1,3-divinyl-1,1,3,3-tetramethyldisiloxane complex of platinum (a content of platinum in the solution=0.6 mass %), and 1.4 parts by mass of tetra(n-butyl)titanate, were uniformly mixed to prepare a primer composition (2).

Reference Example 7

92 parts by mass of n-heptane, 0.2 parts by mass of tetraethoxysilane, 4 parts by mass of ethyl polysilicate, and 4 parts by mass of tetra(n-butyl)titanate, were uniformly mixed to prepare a primer composition (3).

Reference Example 8

94 parts by mass of n-heptane, 4.2 parts by mass of allyltrimethoxysilane, 0.5 parts by mass of a 1,3-divinyl-1,1,3,3-tetramethyldisiloxane solution of a 1,3-divinyl-1,1,3,3-tetramethyldisiloxane complex of platinum (a content of platinum in the solution=0.6 mass %), 1.4 parts by mass of tetra(n-butyl)titanate, and 10.1 parts by mass of an organopolysiloxane represented by the following average unit formula:

[H(CH$_3$)$_2$SiO$_{1/2}$]$_{0.65}$(CF$_3$C$_2$H$_4$SiO$_{3/2}$)$_{0.35}$, were uniformly mixed to prepare a primer composition (4).

Examples 1 to 4 and Comparative Examples 1 to 6

An adherend was prepared by adhering a Teflon (registered trademark) pressure sensitive adhesive tape to one end on one surface of a 6 cm long and 2.5 cm wide stainless steel plate. Then, a primer composition was applied to a portion to which the Teflon (registered trademark) pressure sensitive adhesive tape was not adhered, and left at room temperature for 60 minutes to air dry. After air-drying, the fluorosilicone rubber composition was applied to an entire surface of the stainless steel plate such that the thickness was 2 mm, and then cured by heating and pressing for 10 minutes under a pressure of 200 kgf/cm² and a temperature of 170° C. to obtain an adhesive test piece. When the Teflon (registered trademark) pressure sensitive adhesive tape was peeled off from the obtained adhesive test piece, the fluorosilicone rubber adhered only to the portion where the primer composition had been applied in advance. The peeling adhesive strength of the fluorosilicone rubber to the stainless steel at 90° was measured in accordance with a method specified in JIS K 6854. Furthermore, the peeled state of the adhered portion of the fluorosilicone rubber after the test was observed. When cohesive failure occurred, the cohesive failure rate (cohesive failure portion area/total adhesive area) was measured. From the measurement results, the curing adhesion was evaluated in the following four stages, and the results are shown in Tables 1 and 2.

⊚: 100% cohesive failure (100% of break in rubber layer)
○: 50 to 99% cohesive failure
Δ: 0 to 49% cohesive failure
x: 100% interface peeling

TABLE 1

|  | Examples | | | |
|---|---|---|---|---|
|  | 1 | 2 | 3 | 4 |
| Type of Fluorosilicone Rubber Composition | (1) | (2) | (3) | (3) |
| Type of Primer Composition | (1) | (2) | (1) | (2) |
| Adhesion | ○ | ○ | ○ | ○ |
| Adhesive strength (N/mm) | 2.0 | 1.8 | 2.6 | 2.3 |

TABLE 2

|  | Comparative Examples | | | | | |
|---|---|---|---|---|---|---|
|  | 1 | 2 | 3 | 4 | 5 | 6 |
| Type of Fluorosilicone Rubber Composition | (3) | (1) | (4) | (1) | (2) | (4) |
| Type of Primer Composition | (3) | (4) | (2) | (3) | (3) | (1) |
| Adhesion | Δ | x | x | x | x | x |
| Adhesive strength (N/mm) | 1.2 | 0.3 | 0.5 | 0.5 | 0.4 | 0.4 |

Examples 5 to 8

An adherend was prepared by adhering a Teflon (registered trademark) pressure sensitive adhesive tape to one end on one surface of a 6 cm long and 2.5 cm wide polybutylene terephthalate (PBT) resin sheet. Furthermore, the primer composition was applied to a portion to which the Teflon (registered trademark) pressure sensitive adhesive tape was not adhered, and left at room temperature for 60 minutes to air dry. After air-drying, the fluorosilicone rubber composition was applied to the entire surface of the PBT resin sheet such that the thickness was 2 mm, and then cured by heating and pressing for 10 minutes under a pressure of 200 kgf/cm² and a temperature of 170° C. to obtain an adhesive test piece. When the Teflon (registered trademark) pressure sensitive adhesive tape was peeled off from the obtained adhesive test piece, the fluorosilicone rubber adhered only to the portion where the primer composition had been applied in advance. The peeling adhesive strength of the fluorosilicone rubber to the PBT resin sheet at 90° was measured in accordance with a method specified in JIS K 6854. Furthermore, the peeled state of the adhered portion of the fluorosilicone rubber after the test was observed. When cohesive failure occurred, the cohesive failure rate (cohesive failure portion area/total adhesive area) was measured. From the measurement results, the curing adhesion was evaluated in the following four stages, and the results are shown in Table 3.

⊚: 100% cohesive failure (100% of break in rubber layer)
○: 50 to 99% cohesive failure
Δ: 0 to 49% cohesive failure
x: 100% interface peeling

TABLE 3

|  | Examples | | | |
|---|---|---|---|---|
|  | 5 | 6 | 7 | 8 |
| Type of Fluorosilicone Rubber Composition | (1) | (3) | (2) | (3) |
| Type of Primer Composition | (1) | (1) | (2) | (2) |
| Adhesion | ○ | ○ | ○ | ○ |
| Adhesive strength (N/mm) | 1.8 | 2.3 | 2.5 | 2.0 |

INDUSTRIAL APPLICABILITY

The fluorosilicone rubber laminate obtained by the producing method of the present invention has excellent adhesion between a fluorosilicone rubber layer and substrate, and the fluorosilicone rubber has excellent heat resistance and fuel oil resistance. Therefore, the laminate is suitable for rollers parts such as fixing roller, paper feeding rollers, and the like; transporting machine parts and oil shipping machine parts such as automobiles, aircraft, and the like; and diaphragm parts.

REFERENCE NUMERALS

1: Substrate
2: Primer layer
3: Fluorosilicone rubber layer

The invention claimed is:
1. A method of producing a fluorosilicone rubber laminate, the method comprising:
  (1) applying a primer composition onto a substrate, and then forming a primer layer on a surface of the substrate by drying or curing the primer composition; and
  (2) bringing a fluorosilicone rubber composition into contact with the primer layer, and then adhering a fluorosilicone rubber to the primer layer by curing the fluorosilicone rubber composition;
  wherein:
    the primer composition does not simultaneously comprise a platinum-based catalyst and a fluorosiloxane containing a silicon atom-bonded hydrogen atom; and
  wherein one of the following provisos I) or II) is true:
    I) the fluorosilicone rubber composition comprises:
      (a) (a1) an organopolysiloxane having at least 2 alkenyl groups in a molecule, wherein at least 20 mol % of all silicon atom-bonded organic groups are fluoroalkyl groups, or
        a mixture of component (a1) and (a2) an organopolysiloxane having at least 2 alkenyl groups and having no fluoroalkyl groups or having fluoroalkyl groups in an amount that is less than 20% of all silicon atom-bonded organic groups in a molecule;
      (b) an organic peroxide; and
      (c) a platinum-based catalyst; and
    wherein the primer composition comprises:
      (d) a fluorosiloxane containing a silicon atom-bonded hydrogen atom;
      (e) an alkoxysilane and/or a partially hydrolyzed condensate thereof; and
      (f) a condensation-reaction catalyst;
    II) the fluorosilicone rubber composition comprises:
      (a) (a1) an organopolysiloxane having at least 2 alkenyl groups in a molecule, wherein at least 20 mol % of all silicon atom-bonded organic groups are fluoroalkyl groups, or
        a mixture of component (a1) and (a2) an organopolysiloxane having at least 2 alkenyl groups and having no fluoroalkyl groups or having fluoroalkyl groups in an amount that is less than 20% of all silicon-bonded organic groups in a molecule;
      (c) a platinum-based catalyst; and
      (d) a fluorosiloxane containing a silicon atom-bonded hydrogen atom; and
    wherein the primer composition comprises:
      (d) a fluorosiloxane containing a silicon atom-bonded hydrogen atom;
      (e) an alkoxysilane and/or a partially hydrolyzed condensate thereof; and
      (f) a condensation-reaction catalyst.

2. The method according to claim 1, wherein the substrate is a metal or a plastic.

3. The method according to claim 1, wherein proviso I) is true.

4. The method according to claim 3, wherein component (d) is at least one type selected from:
  i) a fluorosiloxane represented by the following general formula:

wherein $R^1$ is the same or different and is a monovalent hydrocarbon group having from 1 to 20 carbon atoms free of an aliphatic unsaturated bond, $R^f$ is the same or different fluoroalkyl group, "m" is an integer of 1 or more, "n" is an integer of 2 or more, and the sum of "m" and "n" is an integer of from 5 to 100; or ii) a fluorosiloxane represented by the following average unit formula:

wherein $R^1$ and $R^f$ are the same as described above, and "a" and "b" are numbers satisfying: $0<a<1$, $0<b<1$, and $a+b=1$, respectively.

5. The method according to claim 1, wherein proviso II) is true.

6. The method according to claim 5, wherein component (d) is at least one type selected from:
   i) a fluorosiloxane represented by the following general formula:

$R^1_3SiO(R^1R^fSiO)_m(R^1HSiO)_nSiR^1_3$ wherein $R^1$ is the same or different and is a monovalent hydrocarbon group having from 1 to 20 carbon atoms free of an aliphatic unsaturated bond, $R^f$ is the same or different fluoroalkyl group, "m" is an integer of 1 or more, "n" is an integer of 2 or more, and the sum of "m" and "n" is an integer of from 5 to 100; or
   ii) a fluorosiloxane represented by the following average unit formula:

$[HR^1_2SiO_{1/2}]_a(R^fSiO_{3/2})_b$ wherein $R^1$ and $R^f$ are the same as described above, and "a" and "b" are numbers satisfying:
   $0<a<1$, $0<b<1$, and $a+b=1$, respectively.

7. A fluorosilicone rubber laminate obtained by the method according to claim 1, the laminate comprising:
   the fluorosilicone rubber; and
   the substrate.

8. The method according to claim 1, wherein component (d) is:
   i) a fluorosiloxane represented by the following general formula:

$R^1_3SiO(R^1R^fSiO)_m(R^1HSiO)_nSiR^1_3$ wherein $R^1$ is the same or different and is a monovalent hydrocarbon group having from 1 to 20 carbon atoms free of an aliphatic unsaturated bond, R' is the same or different fluoroalkyl group, "m" is an integer of 1 or more, "n" is an integer of 2 or more, and the sum of "m" and "n" is an integer of from 5 to 100.

9. The method according to claim 1, wherein component (d) is:
   ii) a fluorosiloxane represented by the following average unit formula:

$[HR^1_2SiO_{1/2}]_a(R^fSiO_{3/2})_b$ wherein $R^1$ is the same or different and is a monovalent hydrocarbon group having from 1 to 20 carbon atoms free of an aliphatic unsaturated bond, $R^f$ is the same or different fluoroalkyl group, and "a" and "b" are numbers satisfying: $0<a<1$, $0<b<1$, and $a+b=1$, respectively.

* * * * *